United States Patent [19]

Smith

[11] Patent Number: 4,683,970

[45] Date of Patent: Aug. 4, 1987

[54] TRAILER FOR ALL-TERRAIN VEHICLE

[75] Inventor: Morley L. Smith, Beaconsfield, Canada

[73] Assignee: Ontario Drive and Gear Limited, New Hamburg, Canada

[21] Appl. No.: 853,228

[22] Filed: Apr. 17, 1986

[51] Int. Cl.[4] .......................... B62J 15/00; B62R 5/00

[52] U.S. Cl. ........................................ 180/15; 180/16; 180/21; 180/9.26; 180/210; 180/215

[58] Field of Search ................. 180/210, 213, 215, 15, 180/16, 21, 9.26, 28, 30

[56] References Cited

U.S. PATENT DOCUMENTS

| | | | |
|---|---|---|---|
| 2,896,963 | 7/1959 | Ramon | 180/15 |
| 3,158,220 | 11/1964 | Griffith | 280/239 |
| 4,535,869 | 8/1985 | Tsutsumikoshe et al. | 180/215 |

*Primary Examiner*—John J. Love
*Assistant Examiner*—Donn McGiehan
*Attorney, Agent, or Firm*—Anthony Asquith & Co.

[57] ABSTRACT

The trailer disclosed is hitched to an all-terrain vehicle, particularly an all-terrain tricycle, not just by the conventional universal-swiveling trailer hitch but also by spring struts. The springs extend and converge forwards and upwards from the ends of the trailer axle to attachment points behind the seat of the vehicle. The springs aid in making the combined vehicle and trailer more manageable over rough ground. The springs especially curb a tendency of a tricycle when under power to rear up at the front. The invention is particularly for use when tracks are added between the trailer wheels and the vehicle wheels.

14 Claims, 5 Drawing Figures

TRAILER FOR ALL-TERRAIN VEHICLE

This invention relates to trailers for all-terrain vehicles.

The invention is applicable for use with different kinds of all-terrain vehicles, with or without tracks, bicycles, and multi-axled vehicles. The invention will be described particularly in its application to an all-terrain tricycle (ATT).

A conventional trailer for a vehicle includes a load platform fixed to a more or less rigid frame, to which is mounted an axle, with or without some resilient suspension means. The trailer is secured to the vehicle by means of a hitch. The hitch permits the trailer to swivel about the roll, yaw, and pitch axes, relative to the vehicle.

On an all-terrain vehicle, particularly an ATT, such a trailer is somewhat unmanageable, once the speed gets above a very low value. The rougher the surface, the more unmanageable the ATT/trailer combination can become. The trailer tends to whip the ATT first to one side then the other, and it takes quick reactions and physical effort on the part of the ATT rider to hold the combination against these sudden violent slewing motions.

In the invention, the conventional swivel-hitch connector is not the only connection between the trailer and the vehicle. In the invention, two compression-spring struts are provided, and these extend from attachment points near the wheels of the trailer forwards, and upwards, to attachment points on the body of the vehicle.

These spring struts act to stabilize the trailer to a very marked degree. In effect, the trailer wheels become part of the vehicle. It is as if the vehicle had acquired a longer wheelbase. The springs especially resist a tendency of the vehicle when under power to rear up at the front, a tendency which in tricycles, with their short wheelbases, can be quite troublesome.

When one side of the vehicle passes over a deep hole but a hole which is quite short in relation to the length of the vehicle, the vehicle and trailer undergo relative pitching, yawing, and rolling. All three of these modes can be controlled by the springs.

For good stability and control, the spring-to-trailer attachment point should be far out towards the ends of the axles, near the wheels. The spring-to-vehicle attachment point should be at a higher horizontal level than the trailer hitching point. The spring-to-vehicle attachment points should preferably be closer together than the spring-to-trailer attachment points, so that the spring struts converge as they slope upwards and forwards to the vehicle. However, the spring-to-vehicle attachment points should not come together to a single point, but should still be well-spaced.

Not withstanding the above advantages to the invention it is when the trailer wheels are connected to the vehicle wheels with add-on segmented tracks that a major benefit of the invention arises. Without the springs it is hardly possible to avoid shedding the tracks at reasonably fast speeds, and over rough ground. But with the springs, it is as if the vehicle and trailer are one unitary vehicle as far as manageability, traction, and steering are concerned, yet they still are separate articulated components of a combination as regards the ability of the combination of traverse deep, short ditches, and other obstacles.

Naturally, the provision of tracks requires that there be two rear wheels on the vehicle; the vehicle that gains the most from the invention is the typical short-wheel-based tricycle, or ATT.

Figure 1:
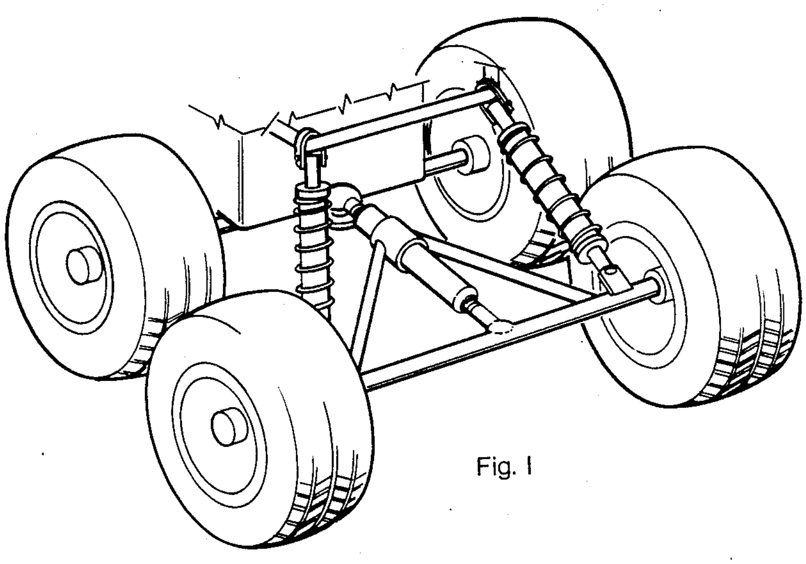
FIG. 1 is a perspective view of an all all-terrain tricycle (ATT), with a trailer hitched behind.
Figure 5:
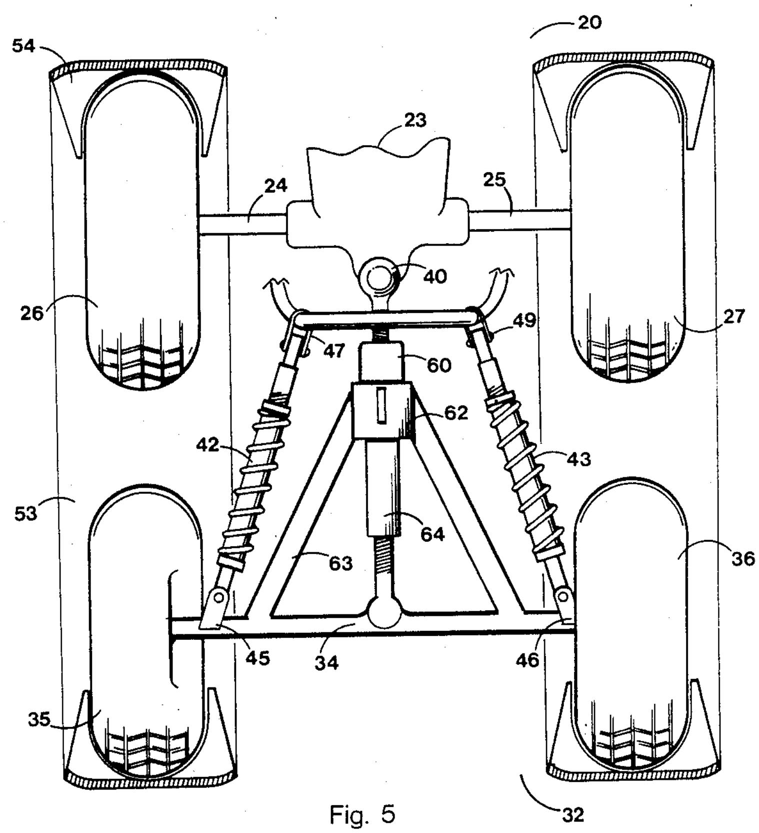
Figure 2:
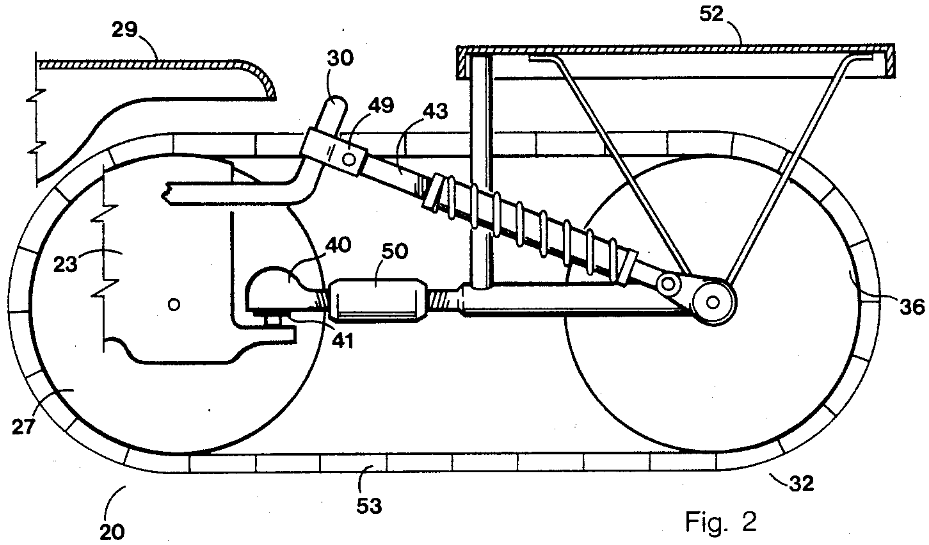
FIG. 2 is a sectioned side-elevation.
Figure 4:
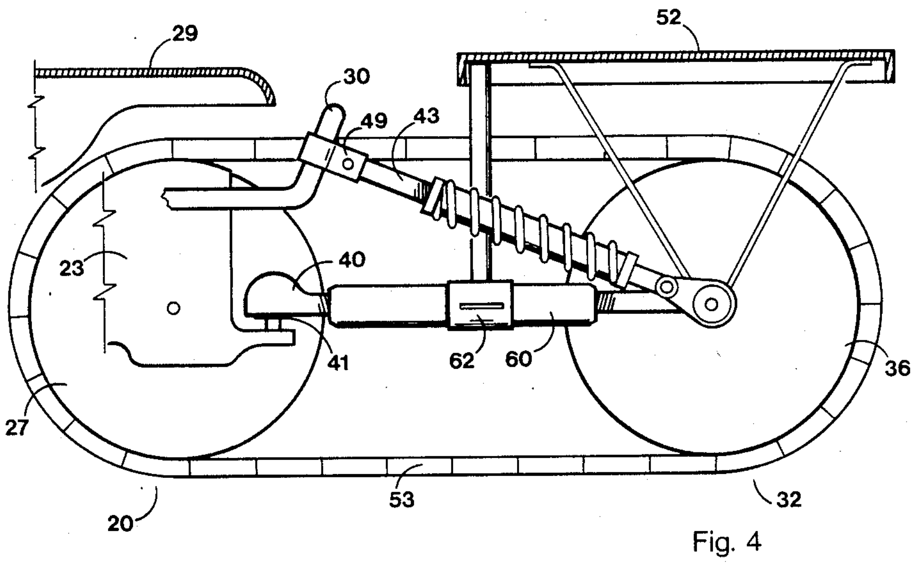
Figure 3:
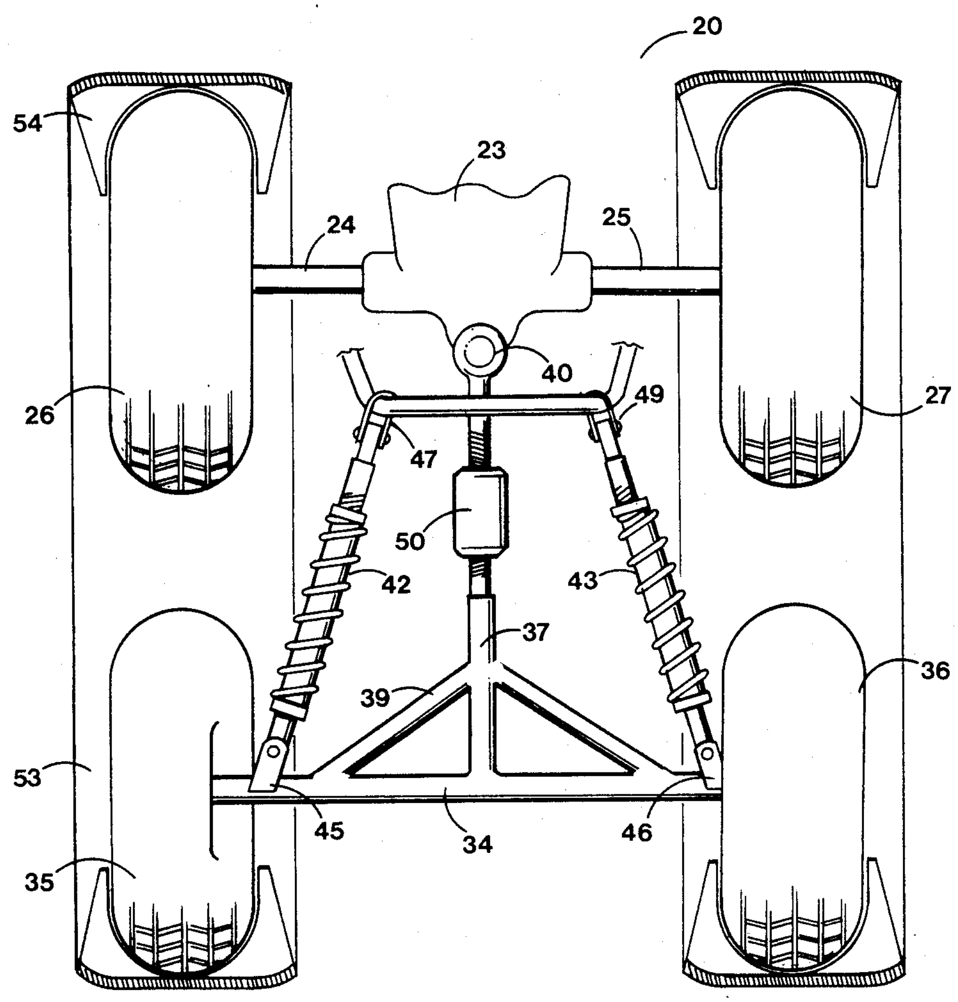
FIG. 3 is a plan.

FIGS. 4 and 5 correspond to FIGS. 2 and 3 and show an alternative version.

Various of the components of the ATT and the trailer have been left off some of the drawings, for clarity of illustration.

The ATT 20 includes a final drive unit which is housed in a box 23. Engine drive is transmitted through this to the left and right rear axles 24, 25, and to the rear road wheels 26, 27. The box 23 may or may not include a differential.

The ATT may or may not include a means for permitting the rear axles 24, 25 to undergo resilient up/-down suspension movements relative to the body of the ATT. If such means is provided, the box 23 would be a part of the unsprung axle structure. The (sprung) body of the ATT includes a shroud 29 and a rail 30 which is part of the frame of the ATT.

The trailer 32 includes a trailer axle 34, and two trailer road wheels 35, 36. The wheels 35, 36 are preferably mounted on the axle 34 so as to permit independent relative rotation.

The trailer 32 includes a hitching link 37. In FIGS. 2 and 3 the link 37 is welded to the trailer axle 34, and the rigidity of the connection between the link 37 and the axle 34 is enhanced by the presence of welded-in gussets 39. No relative movement at all is permitted by the illustrated connection between the link 37 and the axle 34: in alternative embodiments, however, there may be compliance at this connection to permit some relative swiveling.

The forward end of the hitching link 37 is provided with a ball-socket 40, which attaches to a conventional hitching ball 41 which constitutes a hitching point on the box 23. The ball connection permits the link 37 to swivel relative to the box 23 in the universal mode, i.e. in all three of the pitch, roll and yaw modes.

The trailer 32 is not free to swivel unrestrainedly about the hitching point, however, because of the presence of compression spring struts 42, 43. These struts run from spring-to-axle attachment points 45, 46 on the trailer axle 34, which are as widely spaced as possible, to spring-to-vehicle attachment points 47, 49 on the rail 30.

Mounted in this manner, the spring struts 42, 43 converge towards the front in the plan view, and rise towards the front in elevation.

The link 37 is adjustable as regards its longitudinal length by means of a turnbuckle 50.

The trailer also includes a load platform 52 (not shown in FIG. 3) which is fixed rigidly to the combined link/axle structure.

The ATT and trailer is intended for use with tracks, but the combination may be used without tracks. Indeed, it is one of the features of the invention that the improved stability and handle-ability that the invention provides is gained whether tracks are in use or not. ATTs are used not only in very slippery conditions (such as wet snow, mud, etc) but also in reasonably dry conditions. When there is ample traction available, there is little point in going to the trouble of putting on tracks, and the invention allows the trailer to be used in that simple way to carry such loads as may be required. Also, even if the trailer is not required for the purpose of carrying loads, it can still be advantageous to fit an un-tracked trailer, using the spring struts in the manner of the invention: for example to increase the manageability of the ATT over ground where th problem lies not in traction but in exceptional unevenness.

The main intention, though, is that the trailer 32 be used with tracks. The tracks 53 are illustrated diagrammatically; the tracks are of the linked, articulated segment kind, preferably of plastic, and preferably of the kind that includes high side-pieces 54 which locate from the sides to the wheels 26, 27, 35, 36 and prevent the track 53 from shredding.

To assemble the track, the trailer is first hitched behind the ATT, and the spring struts 42, 43 are fitted in place. The link 37 is shortened at the turnbuckle 50, and the spring struts are set so that their coil springs are exerting no force between the attachment points.

Now, the left wheels 26, 35 may be pulled together in the longitudinal direction until the left track can be slipped over the wheels. Next, the right wheels are pulled together, and the right track slipped on.

The turnbuckle 50 is used to lengthen the link 37 until there is an adequate tension in the tracks. The link 37 is, of course, not at all resilient, but there is a good deal of compliance in the track, due to the very soft tires that are used in ATTs. Once the track tension has been adjusted by the turnbuckle 50, the spring struts 42, 43 are released. The springs therefore are not provided primarily to set the track tension, though they do contribute somewhat towards that. The primary purpose of the springs lies in their contribution to the suspension of the trailer axle and in their further contribution to providing resilient control to the swivelling movement of the trailer, in all three of the pitch, roll and yaw modes.

The spring struts 42, 43 can include hydraulic dampers, though only a light damping action is needed.

Sometimes, a greater length of adjustment of the turnbuckle is needed than can be provided by the apparatus shown in FIGS. 2 and 3. The hitching link can still be supported on gussets, though, even if the sleeve of the turnbuckle is long.

This may be achieved as shown in FIGS. 4 and 5. Here, the sleeve 60 of the turnbuckle is rotatable, for adjusting the length of the link 64, inside a loosely fitting collar 62. The collar 62 is welded to gussets 63, which are in turn welded to the trailer axle.

The load platform 52 also now is supported from the collar 62.

The FIGS. 4 and 5 version is preferred because it relieves the turnbuckle of a restriction as to its adjustment length; also, the turnbuckle is relieved of at least some of the bending stresses experienced by the turnbuckle in the FIG. 2 version.

The connection of the link 64 to the trailer axle 34 need not itself be rigid—a ball joint 65 being illustrated. This is preferred because the joint 65 is easily accessible from the rear of the trailer, and the presence of this easily unhitchable joint makes it easier for a person to assemble/disassemble the ATT/trailer combination.

I claim:

1. Detachable all-terrain trailer which is suitable for use with an all-terrain vehicle, characterised in that the trailer includes a frame and a trailer axle;

in that the trailer includes left and right road wheels, one at each end of the trailer axle;

in that the trailer includes a hitching link, which is secured to the frame of the trailer;

in that the hitching link includes a hitching connection, which is suitable for attaching the link to a hitching point on the vehicle;

in that the hitching connection includes a universal-joint means, which is effective, when attached to the said hitching point, to permit the trailer to move, substantially freely, in a universal mode, i.e. in a pitch mode, in a roll mode, and in a yaw mode, relative to the vehicle;

in that the trailer includes a spring means;

in that the spring means is suitable for attachment to, and for operative engagement with, the rear of the vehicle;

in that the spring means is so constructed and arranged that the spring means acts, when attached to the vehicle:

(a) to resiliently urge the rear of the vehicle upwards, thereby to transfer some of the weight of the vehicle to the trailer; and at the same time (b) in the event that the trailer becomes deflected to right or left of the vehicle in the yaw mode, about the hitching connection, to resiliently urge and restore the trailer positively to a directly trailing position; in line behind the vehicle.

2. Combination of the trailer of claim 1 and the vehicle to which the trailer is attached, where the wheelbase of the vehicle is roughly equal in length to the distance between the rear axle of the vehicle and the axle of the trailer.

3. Trailer of claim 1, where the spring means comprises:

a left compression spring, which extends from a left spring-to-trailer attachment point, which is situated on the trailer near the left road wheel, forwards to a left spring-to-vehicle attachment point in the vehicle;

a right compression spring, which extends from a right spring-to-trailer attachment point, which is situated on the trailer near the right road wheel, forwards to a right spring-to-vehicle attachment point in the vehicle.

4. Trailer as claimed in claim 3, where the two springs (42, 43) converge towards the vehicle, in that the two spring-to-vehicle attachment points (47, 49) are closer together than the two spring-to-trailer attachment points (45, 46).

5. Trailer as claimed in claim 4, where the two spring-to-vehicle attachment points (47, 49) are spaced a substantial distance apart.

6. Trailer as claimed in claim 3, where the spring-to-vehicle attachment points (47, 49) are a substantial distance higher up on the vehicle than the hitching point (40).

7. Trailer as claimed in claim 3, where the spring-to-trailer attachment points (45, 46) are closely adjacent to the axis of rotation of the respective trailer wheels.

8. Trailer as claimed in claim 3, where the trailer includes an adjusting means (50; 60) for adjusting longitudinally the position of the hitching connection (40) relative to the trailer axle (34).

9. Trailer as claimed in claim 3, where the trailer includes a load platform (52).

10. Trailer as claimed in claim 9, where there is substantially no provision for the trailer axle to undergo suspension movement relative to the load platform.

11. Trailer as claimed in claim 3, where the trailer axle (34) is so arranged that the respective axes of rotation of the two road wheels (35, 36) are solidly constrained to remain co-axial at all times.

12. Trailer as claimed in claim 3, where the hitching link (37; 64) is so solidly secured to the trailer (32) that substantially no relative pitching movement can take place between the trailer axle (34) and the hitching link (37; 64).

13. Trailer as claimed in claim 3, where the hitching link (37; 64) is so solidly secured to the trailer that substantially no relative yawing movement can take place between the trailer axle (34) and the hitching link.

14. Trailer as claimed in claim 3, where the hitching link is so secured to the trailer that relative yawing movement can take place between the trailer axle and the hitching link.

* * * * *